United States Patent
Aneja et al.

(10) Patent No.: US 7,202,912 B2
(45) Date of Patent: Apr. 10, 2007

(54) METHOD AND SYSTEM FOR USING SINGLE OSD PIXMAP ACROSS MULTIPLE VIDEO RASTER SIZES BY CHAINING OSD HEADERS

(75) Inventors: Charu Aneja, Indianapolis, IN (US); Aaron Hal Dinwiddie, Fishers, IN (US)

(73) Assignee: Thomson Licensing, Boulogne, Billancourt (FR)

( * ) Notice: Subject to any disclaimer, the term of this patent is extended or adjusted under 35 U.S.C. 154(b) by 535 days.

(21) Appl. No.: 09/845,959

(22) Filed: Apr. 30, 2001

(65) Prior Publication Data

US 2002/0051154 A1  May 2, 2002

Related U.S. Application Data

(60) Provisional application No. 60/204,053, filed on May 12, 2000.

(51) Int. Cl.
*H04N 5/50* (2006.01)

(52) U.S. Cl. .............. 348/569; 348/554; 348/556; 348/589

(58) Field of Classification Search ............ 348/554, 348/564, 778, 588, 569, 567, 589, 600, 469, 348/461, 467, 465, 468; 345/698, 546, 547, 345/566, 3.3, 545
See application file for complete search history.

(56) References Cited

U.S. PATENT DOCUMENTS

| | | | |
|---|---|---|---|
| 4,477,830 A | 10/1984 | Lindman et al. ............. 358/1 |
| 4,792,936 A | 12/1988 | Picard ....................... 369/59 |
| 5,020,003 A | 5/1991 | Moshenberg ............ 364/518 |
| 5,420,605 A | 5/1995 | Vouri et al. ............... 345/132 |
| 5,489,947 A | 2/1996 | Cooper ..................... 348/589 |
| 5,534,942 A | 7/1996 | Beyers, Jr. et al. ......... 348/569 |
| 5,640,502 A | 6/1997 | Knox et al. ................ 395/507 |
| 5,745,095 A | 4/1998 | Parchem et al. ........... 345/114 |
| 5,936,606 A * | 8/1999 | Lie ........................... 345/629 |
| 6,002,835 A | 12/1999 | Watanabe ................... 386/95 |
| 6,144,414 A * | 11/2000 | Toba ........................ 348/564 |
| 6,175,388 B1 * | 1/2001 | Knox et al. ................ 348/569 |
| 6,462,746 B1 * | 10/2002 | Min et al. .................. 345/545 |
| 6,480,238 B1 * | 11/2002 | Knox et al. ................ 348/569 |

FOREIGN PATENT DOCUMENTS

| | | |
|---|---|---|
| EP | 1 069 770 A2 | 1/2001 |
| EP | 1069770 A2 | 1/2001 |
| WO | WO98/17058 | 4/1989 |
| WO | WO 98/17059 | 4/1998 |

\* cited by examiner

*Primary Examiner*—Trang U. Tran
(74) *Attorney, Agent, or Firm*—Joseph J. Laks; Vincent E. Duffy; Michael A. Pugel

(57) ABSTRACT

A TV system that uses a single pixmap across multiple video rasters having different raster sizes. In general, the TV system uses at least two sets of headers to select different portions of a single pixmap to be displayed based on different raster sizes. Specifically, each of the headers in a header set points to a pixel line to select number of pixels for that pixel line. The number of the headers in a header set determines the height of the pixmap and the pixel number selection by a set of headers determines the width of the pixmap. In response to different displaying modes, the TV system selectively invokes one of the two header sets to select different portions of the single pixmap. By doing so, a single pixmap can be used across multiple video rasters having different raster sizes.

16 Claims, 8 Drawing Sheets

METHOD AND SYSTEM FOR USING SINGLE OSD PIXMAP ACROSS MULTIPLE VIDEO RASTER SIZES BY CHAINING OSD HEADERS

RELATED APPLICATIONS

This is a Non-Provisional Application of Provisional Application Ser. No. 60/204,053 by Aneja et al, filed May 12, 2000.

FIELD OF THE INVENTION

The present invention generally relates to video data processing, and more specifically to video data processing for displaying a bitmap over video images.

BACKGROUND OF THE INVENTION

Home entertainment systems that combine Personal Computer and television functions (PC/TV systems), are increasingly becoming generic user-interactive multiple-source and multiple-destination communication devices. Such multimedia systems are required to communicate in different data formats between multiple locations for a variety of applications in response to user requests. For example, a PC/TV system may receive data from satellite or terrestrial sources comprising High Definition Television (HDTV) broadcasts, Multi-point Microwave Distribution System (MMDS) broadcasts and Digital Video Broadcasts (DVB). A PC/TV system may also receive and transmit data via telephone (e.g., the Internet) and coaxial lines (e.g., cable TV) as well as from both remote and local sources such as Digital Video Disk (DVD), CDROM, VHS and Digital VHS (DVHS™) type players, and PCs.

Such a generic PC/TV entertainment system requires a variety of different On Screen Displays (OSDs) for use with video program content from different sources or for different applications. In such systems, the OSD function is used to display bitmap images which overlay the video image on a TV display, for the purpose of conveying information or displaying menus on the TV display. The OSD is rendered on a "pixmap" in memory, which is mapped to the TV display. This OSD pixmap needs to be the same size as the active video region on the TV display at any location over the video image.

In some systems, the video raster switches between 2H and 2.14H scanning rate modes based on the channel being watched. The size of the active video region is therefore different in each of the two modes. This requires that a different sized OSD pixmap must be available for each raster mode. For example, in 2H mode the OSD size requirement is 480 lines×2096 pixels/line and in 2.14 mode the OSD size requirement is 540 lines×1920 pixels/line. This is because the OSD pixel clock is a function of the video raster clock.

One approach for solving this problem is to keep multiple pixmaps for multiple video images having different raster sizes and to switch to a particular pixmap based on a desired displaying mode. However, one shortcoming of such an approach is that there is a waste of memory space because the approach involves rendering all OSD bitmaps multiple times (once for each pixmap). Another shortcoming of such an approach is that it slows down the system because the pixmap rendering time will be multiplied.

There is, therefore, a need for an improved method and system that use a single pixmap across multiple video rasters having different sizes. The present invention provides a method and system to meet this need.

SUMMARY OF THE INVENTION

The present invention provides a method and system that use a single pixmap, which contains a plurality of pixel lines, across multiple video rasters having different sizes. In general, the present invention uses at least two sets of headers (e.g., a first and second set of headers) to select different portions of a single pixmap to be displayed based on different raster sizes. Each of the headers in the first or second header set points to a pixel line to select number of pixels for that pixel line. Therefore, the number of the headers in a header set determines the height of the pixmap, and the pixel number selection by a set of headers determines the width of the pixmap. In response to different displaying modes, the present invention selectively invokes the first or second set of headers to select a respective portion of the pixmap to be displayed. By doing so, a single pixmap can be used across multiple video rasters having different sizes.

DETAILED DESCRIPTION OF THE PREFERRED EMBODIMENT

The characteristics and advantages of the present invention will become more apparent from the following description, given by way of example.

Figure 1:
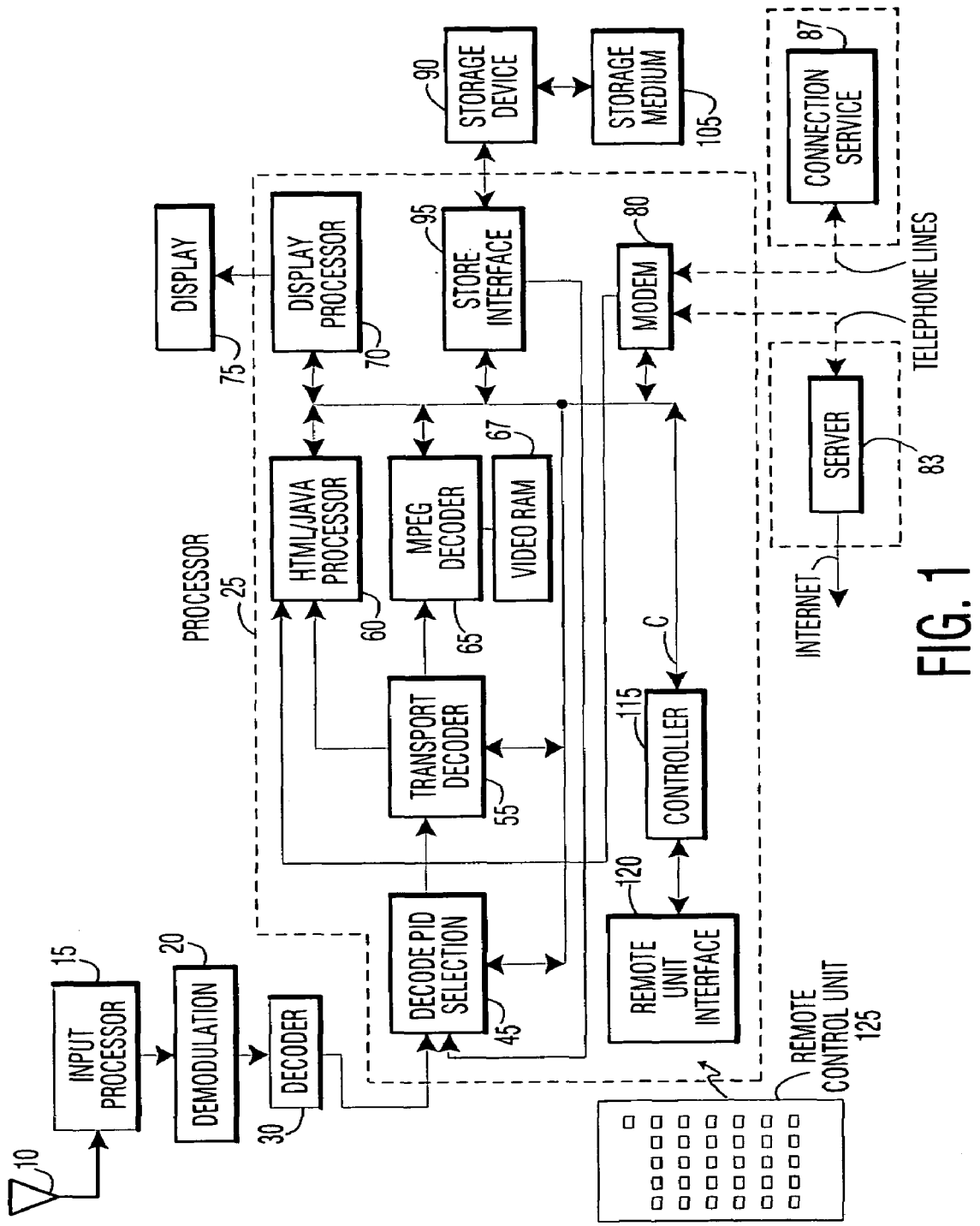
FIG. 1 shows an exemplary home entertainment system for processing OSD header and content data according to the present invention.

Referring now to FIG. 1, a block diagram of an exemplary digital video receiving system that operates according to the principles of the invention is shown. The video receiver system includes an antenna 10 and input processor 15 for receiving and digitizing a broadcast carrier modulated with signals carrying audio, video, and associated data, a demodulator 20 for receiving and demodulating the digital output signal from input processor 15, and a decoder 30 outputting a signal that is trellis decoded, mapped into byte length data segments, de-interleaved, and Reed-Solomon error corrected. The corrected output data from decoder unit 30 is in the form of an MPEG compatible transport data stream containing program representative multiplexed audio, video, and data components.

The video receiver system further includes a modem 80 that may be connected, via telephone lines, to a server 83 or connection service 87 such that data in various formats (e.g., MPEG, HTML, and/or JAVA) can be received by the video receiver system over the telephone lines.

A processor 25 processes the data output from decoder 30 and/or modem 80 such that the processed data can be displayed on a display unit 75 or stored on a storage medium 105 in accordance with requests input by a user via a remote control unit 125. More specifically, processor 25 includes a controller 115 that interprets requests received from remote control unit 125 via remote unit interface 120 and appropriately configures the elements of processor 25 to carry out user requests (e.g., channel, website, and/or OSD display). In one exemplary mode, controller 115 configures the elements of processor 25 to provide MPEG decoded data and an OSD for display on display unit 75. In another exemplary mode, controller 15 configures the elements of processor 25 to provide an MPEG compatible data stream for storage on storage medium 105 via storage device 90 and store interface 95. In a further exemplary mode, controller 115 configures the elements of processor 25 for other communication modes, such as for receiving bidirectional (e.g. Internet) communications via server 83 or connection service 87.

Processor 25 includes a decode PID selection unit 45 that identifies and routes selected packets in the transport stream from decoder 30 to transport decoder 55. The transport stream from decoder 30 is demultiplexed into audio, video, and data components by transport decoder 55 and is further processed by the other elements of processor 25, as described in further detail below.

The transport stream provided to processor 25 comprises data packets containing program channel data, ancillary system timing information, and program specific information such as program content rating and program guide information. Transport decoder 55 directs the ancillary information packets to controller 115 which parses, collates, and assembles the ancillary information into hierarchically arranged tables. Individual data packets comprising the user selected program channel are identified and assembled using the assembled program specific information. The system timing information contains a time reference indicator and associated correction data (e.g. a daylight savings time indicator and offset information adjusting for time drift, leap years, etc.). This timing information is sufficient for a decoder to convert the time reference indicator to a time clock (e.g., United States east coast time and date) for establishing a time of day and date of the future transmission of a program by the broadcaster of the program. The time clock is useable for initiating scheduled program processing functions such as program play, program recording, and program playback. Further, the program specific information contains conditional access, network information, and identification and linking data enabling the system of FIG. 1 to tune to a desired channel and assemble data packets to form complete programs. The program specific information also contains ancillary program content rating information (e.g., an age based suitability rating), program guide information (e.g., an Electronic Program Guide—EPG) and descriptive text related to the broadcast programs as well as data supporting the identification and assembly of this ancillary information.

Transport decoder 55 provides MPEG compatible video, audio, and sub-picture streams to MPEG decoder 65. The video and audio streams contain compressed video and audio data representing the selected channel program content. The sub-picture data contains information associated with the channel program content such as rating information, program description information, and the like.

MPEG decoder 65 cooperates with a random access memory (RAM) 67 to decode and decompress the MPEG compatible packetized audio and video data from unit 55 and provides decompressed program representative pixel data to display processor 70. Decoder 65 also assembles, collates and interprets the sub-picture data from unit 55 to produce formatted program guide data for output to an internal OSD module (See FIGS. 2, 3 and 7). The OSD module cooperates with RAM 67 to process the sub-picture data and other information to generate pixel mapped data representing subtitling, control, and information menu displays including selectable menu options and other items for presentation on display device 75 in accordance with the present invention. The control and information menus that are displayed enable a user to select a program to view and to schedule future program processing functions including tuning to receive a selected program for viewing, recording of a program onto storage medium 105, and playback of a program from medium 105.

The control and information displays, including text and graphics produced by the OSD module, are generated in the form of overlay pixel map data under direction of controller 115. The overlay pixel map data from the OSD module is combined and synchronized with the decompressed pixel representative data from MPEG decoder 65 under direction of controller 115. Combined pixel map data representing a video program on the selected channel together with associated sub-picture data is encoded by display processor 70 and output to device 75 for display.

The principles of the invention may be applied to terrestrial, cable, satellite, Internet or computer network broadcast systems in which the coding type or modulation format may be varied. Such systems may include, for example, non-MPEG compatible systems, involving other types of encoded data streams and other methods of conveying program specific information. Further, although the disclosed system is described as processing broadcast programs, this is exemplary only. The term 'program' is used to represent any form of packetized data such as audio data, telephone messages, computer programs, Internet data or other communications, for example.

The architecture of FIG. 1 is not exclusive. Other architectures may be derived in accordance with the principles of the invention to accomplish the same objectives. Further, the functions of the elements of processor 25 of FIG. 1 may be implemented in whole or in part within the programmed instructions of a microprocessor. In addition, the principles of the invention apply to any form of MPEG or non-MPEG compatible electronic program guide.

Figure 2:
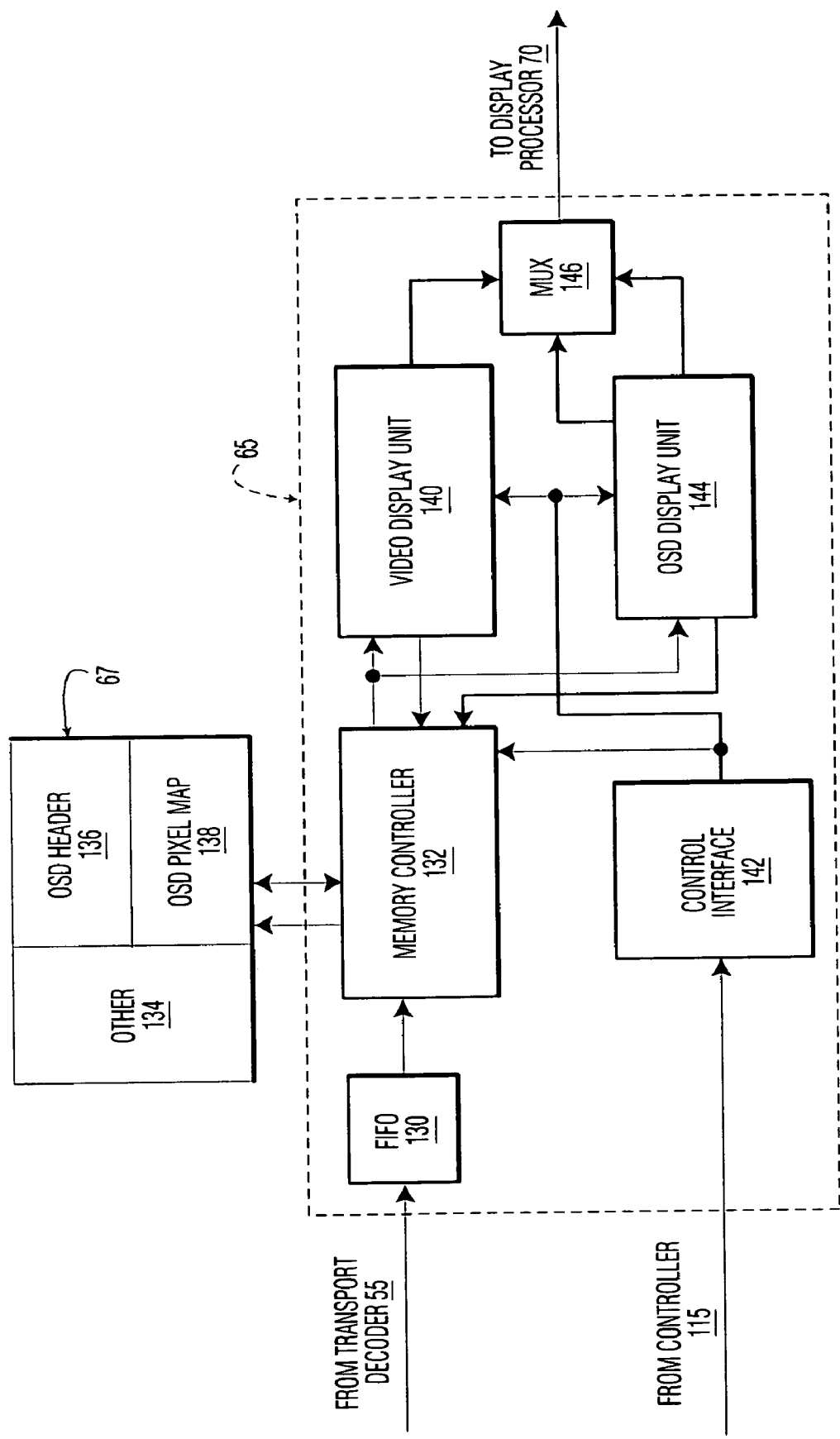
FIG. 2 further illustrates the MPEG decoder and video memory of the exemplary home entertainment decoder system shown in FIG. 1.

Referring now to FIG. 2, MPEG decoder 65 and video RAM 67 are illustrated in further detail. Decoder 65 includes a FIFO buffer memory 130 which receives video data packets on demand in small segments from transport decoder 55 and couples them into relatively larger segments via a memory controller 132 to a section 134 of RAM 67 reserved for decoding and decompression. Video RAM 67 is addressed under the control of memory controller 132. Section 134 of RAM 67 includes a rate buffer section for storing the received video data packets and a frame store section for storing frames of video information during the decoding and decompression operation. A video display unit 140 decodes and decompresses the stored video data packets to form a sequence of video image components. For this purpose, video display unit 140 requests data from the decoding and decompression portion of section 134 via memory controller 132 as required. The sequence of video image components are synchronized with field, line, and pixel rate signals generated by display processor 70. Control data generated by controller 115 is received by controller interface unit 142 and coupled to various elements of MPEG decoder 65 via an internal control bus.

The OSD portion of MPEG decoder 65 includes an OSD display unit 144 which communicates with an OSD header memory block 136 and an OSD pixel map or bitmap memory block 138 of RAM 67 via memory controller 132, as discussed in further detail below. Upon initialization of the video receiver, controller 115 generates a single pixel map and associated pixel map header sets and stores them in OSD pixel map and OSD header blocks of memory 138 and 136 via control interface 142 and memory controller 132.

An output multiplexer 146, under the control of OSD display unit 144, combines the output of video display unit 140 (video image components) and the output of OSD display unit 144 (graphic image components) and passes the video and graphical combination to display processor 70 for display on display unit 75.

Figure 3:
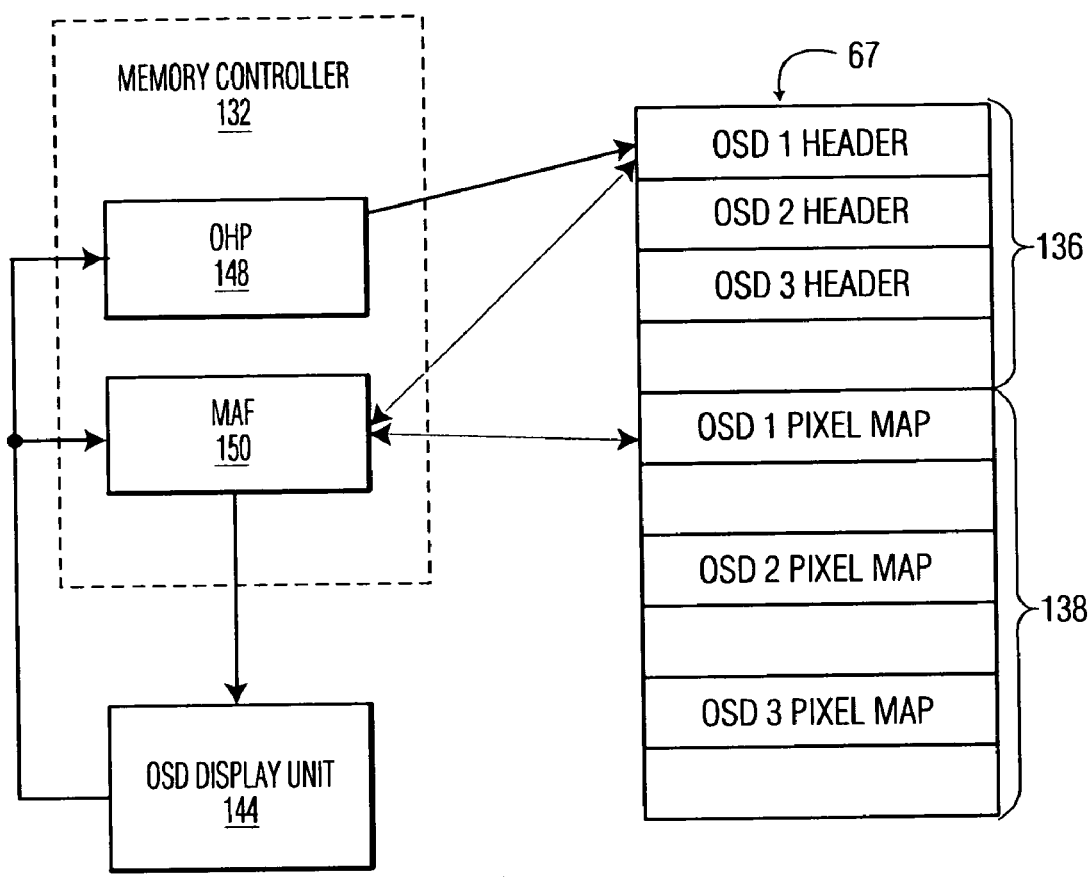
FIG. 3 illustrates a conventional MPEG decoder and video memory arrangement.
Figure 5:
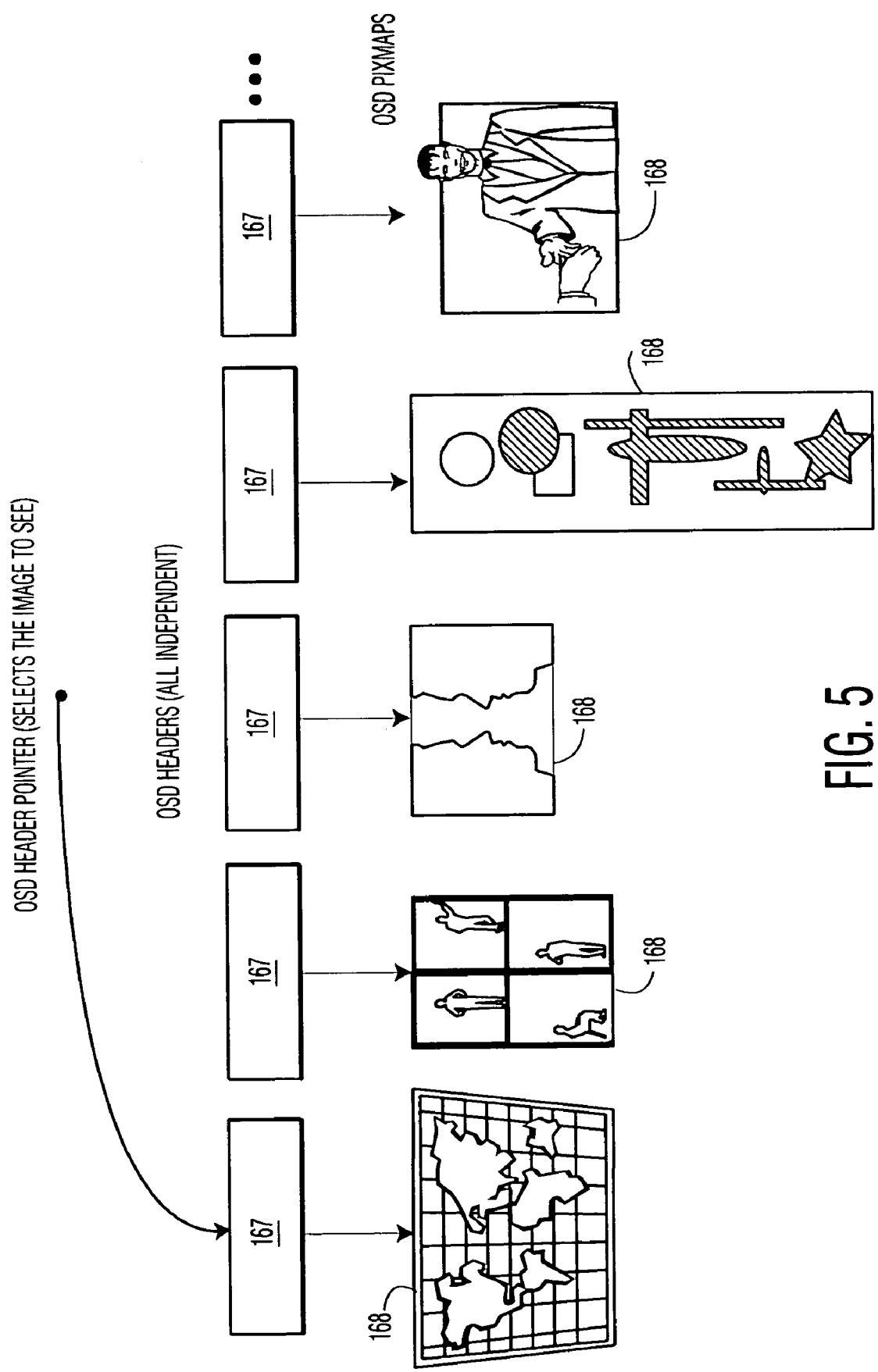
FIG. 5 illustrates conventional OSD data formats.

Referring now to FIG. 3, a conventional OSD management and control arrangement is shown. Memory controller 132 includes, inter alia, an OSD header pointer (OHP) register 148 and a memory access file (MAF) register 150 for facilitating the storage and retrieval of OSD data in OSD header block 136 and OSD pixel map block 138 of memory 67. Memory controller 132 manages the storage and retrieval of OSD data in memory 67 in response to requests from OSD display unit 144. Upon initialization of the video receiver, a plurality of OSD data structures are stored in memory 67. Each OSD data structure includes an OSD header (e.g., "OSD 1", "OSD 2", and "OSD 3" headers) stored in header block 136 of memory 67 and an OSD pixel map (e.g., "OSD 1", "OSD 2", and "OSD 3" pixel maps) stored in pixel map block 138 of memory 67. In accordance with the conventional OSD buffering technique, there is a single OSD header stored in header block 136 for each OSD pixel map stored in pixel map block 138. Each OSD header contains the memory location of the associated pixel map in pixel map block 138 as well as a set of display characteristics that define how the associated pixel map is to be processed by display processor 70 and displayed on display unit 75. For example, the "OSD 1" header contains the memory location of the "OSD 1" pixel map as well as a set of display characteristics defining how the "OSD 1" pixel map is to be processed and displayed. The display characteristics include, but are not limited to, the presence or absence of OSD side panels, the use of pixel compression, the number of bits per pixel, YUV or YIQ colorimetry, degree of transparency, OSD size, OSD format (e.g., interlaced or progressive), OSD color scheme, OSD blending ratio, OSD resolution, aspect ratio, horizontal pixel duplication, vertical pixel duplication, OSD screen location. Some exemplary OSD header and OSD pixel map data structures are illustrated in FIG. 5. As discussed above, each OSD header 167 is associated with a different OSD pixel map 168.

Figure 4:
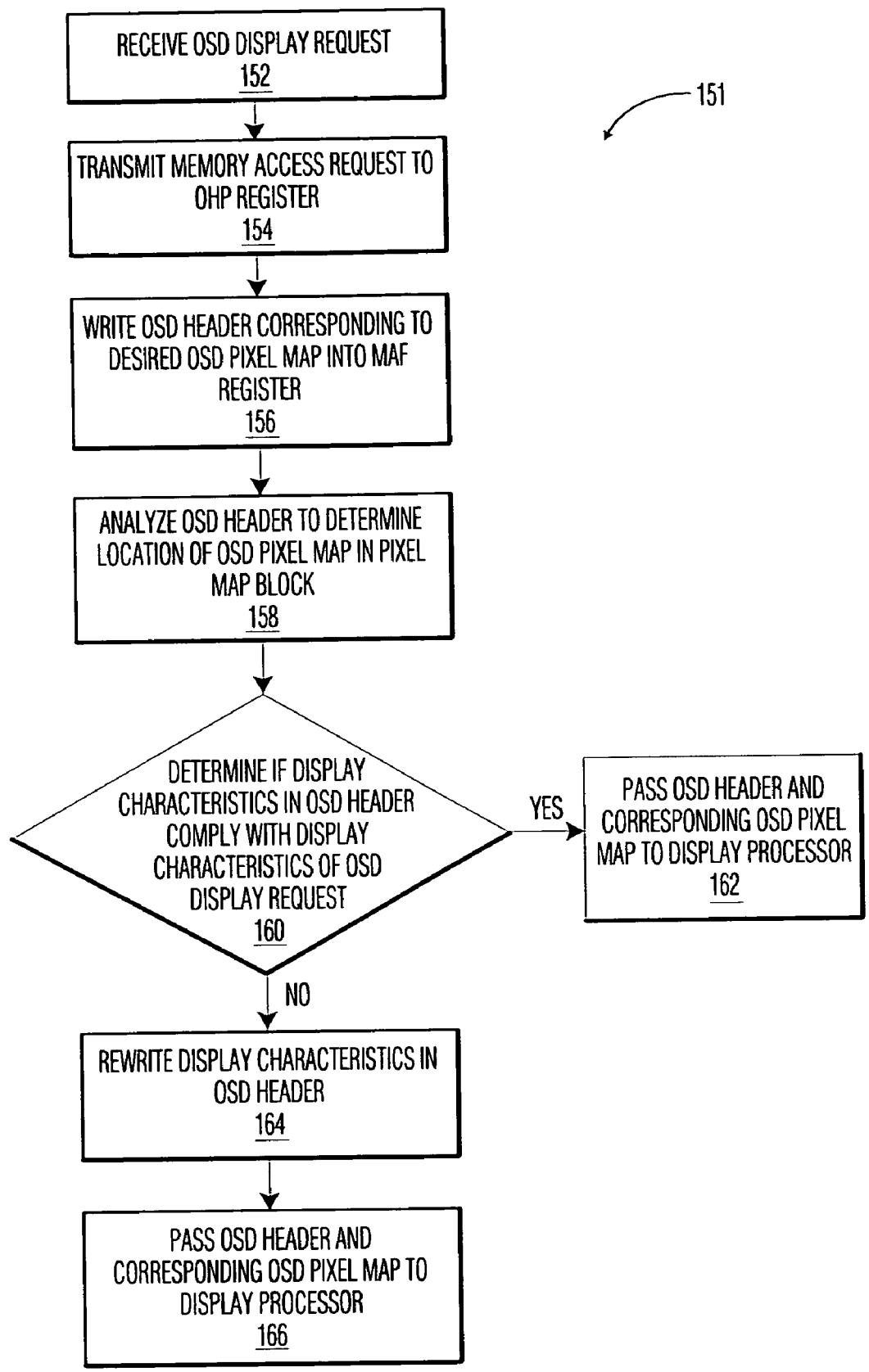
FIG. 4 is a flowchart illustrating a conventional OSD retrieval process.

Referring now to FIG. 4, in conjunction with FIG. 3, a conventional OSD retrieval process 151 is shown. Initially, OSD display unit 144, at step 152, receives an OSD display request from controller 115 to display an OSD (e.g., a graphical image as shown in FIG. 5) on display unit 75. In response to the controller's request, OSD display unit 144, at step 154, transmits a memory access request to OHP register 148. OHP register 148 services the request, at step 156, by writing the OSD header corresponding to the desired OSD pixel map into MAF register 150. OSD display unit 144, at step 158, reads the OSD header to determine the location of the OSD pixel map in pixel map block 138. Once the pixel map location is determined, OSD display unit 144 sets the OSD address in memory controller 132 and requests that memory controller 132 read the image at the set address into MAF register 150. Afterwards, OSD display unit 144, at step 160, determines if the display characteristics in the retrieved OSD header comply with the display characteristics of the OSD display request. For example, the display characteristics of the retrieved header may indicate that the associated pixel map is to be displayed as a blue image in an upper portion of display 75 while the requested display characteristics are for the associated pixel map to be displayed as a green image in a lower portion of display 75. If the display characteristics of the OSD header comply with the requested OSD display characteristics, OSD display unit 144, at step 162, passes the OSD pixel map and the associated display characteristics (as provided in the OSD header) to display processor 70. If the display characteristics of the OSD header do not comply with the requested OSD display characteristics, OSD display unit 144, at step 164, rewrites the display characteristics in the retrieved OSD header and/or redraws the OSD pixel map to contain the requested display characteristics before passing, at step 166, the OSD pixel map (as redrawn) and associated header (as rewritten) to display processor 70. The rewriting of the OSD header and/or redrawing of the OSD pixel map results in a delay between the OSD request from controller 115 and the display of the OSD having the desired display characteristics. In other words, the multiple memory instructions required to modify the OSD header and associated OSD pixel map results in a delay in the display of the OSD. It should be noted that if the OSD display request occurs when the video receiver is involved in a time critical process (e.g., the display of a video program), a delay in the display of the OSD may result in a disruption or distortion of the video (e.g., the introduction of video anomalies) being displayed to a user.

Figure 6:
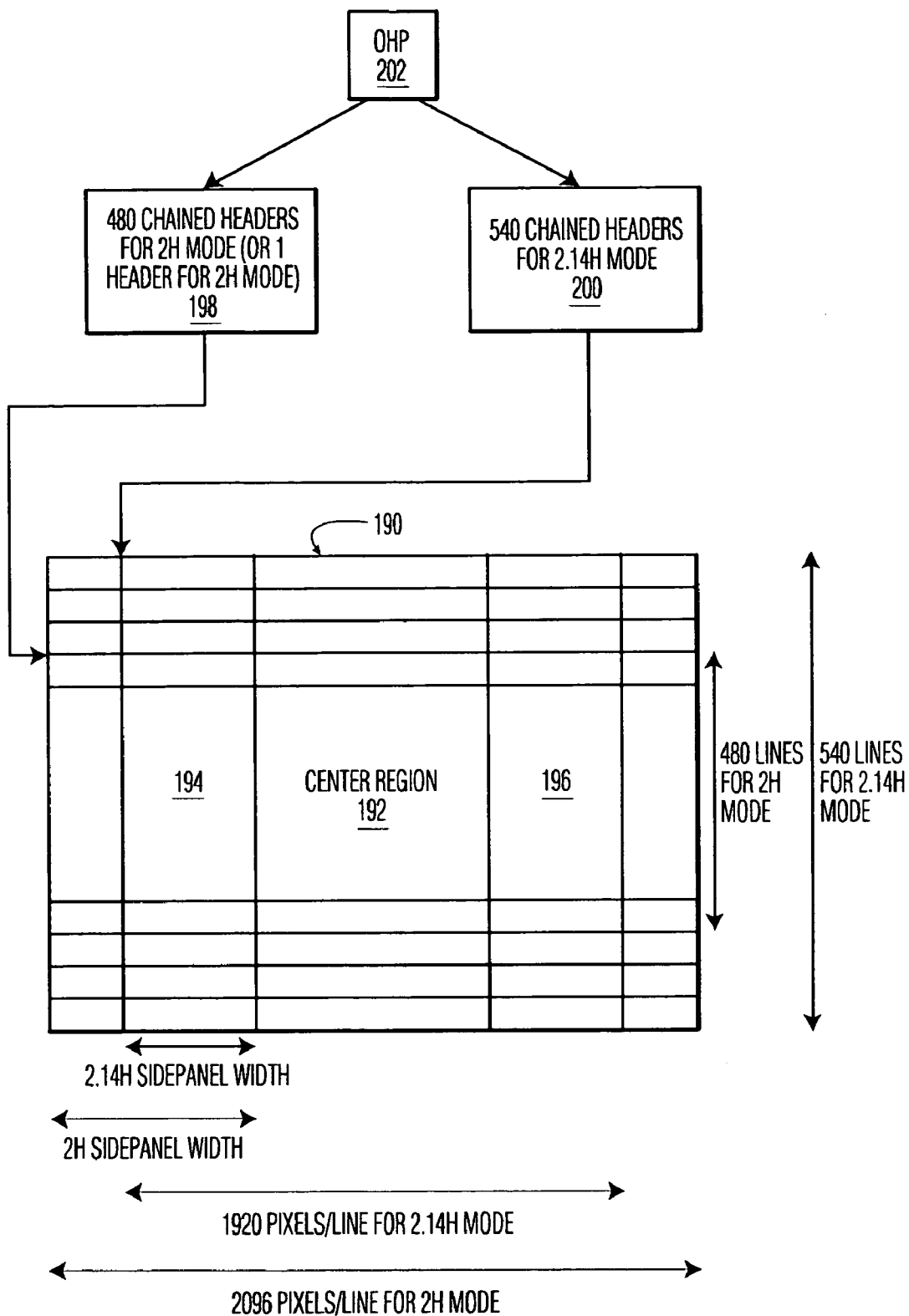
FIG. 6 illustrates an MPEG decoder and video memory arrangement of the present invention.

Referring to FIG. 6, an improved OSD pixmap layout of the present invention is illustrated, in which a single OSD pixmap can be displayed over multiple video raster sizes. As shown in FIG. 6, the pixmap layout includes a pixmap 190, a first set of headers 198, a second set of headers 200, and an OHP (OSD header pointer) 202. The pixmap 190 typically comprises a center region 192 where menus/guides/etc are displayed, left and right side portions that are collectively referred to as sidepanels (194 and 196). The pixels that are selected to be displayed in the sidepanels can be specified to be gray or transparent pixels, depending on whether the underlying video image being displayed is in the 4×3 or 16×9 format. As such, pixmap 190 is designed so that the sidepanels of the pixmap can be manipulated to compensate for the size differences between the two displaying modes while allowing the center portion of the OSD image to appear unchanged.

As an exemplary implementation, pixmap 190 contains 540 pixel lines with each of the pixel line containing 2096 pixels. The first set of headers 198 contains 480 individual headers (or contains only one header), and the second set of headers 200 contains 540 individual headers. The individual headers in the first and second header sets are chained together, and each of the headers points to a single pixel line in pixmap 190. By using the pixmap layout of the present invention, it is possible to use a single pixmap across different video rasters in different displaying modes (i.e., 2H mode and 2.14H mode). Specifically, each of the 480 headers in the first header set 198 points to a single consecutive pixel line of pixmap 190 that is 2096 pixels wide.

Each of the 540 headers in the second header set 200 points to a single consecutive pixel line of pixmap 190 that is 1920 pixels wide. On channel changes, OHP 202 can select either the 480 chained headers in the first header set 198 when in the 2H mode or the 540 chained headers in the second header set 200 when in the 2.14H mode.

It should be noted that to select the width for the pixmap in 2.14H mode each of the headers in the second header set 200 only selects a portion of the pixels (e.g., 1920 out of 2096 pixels) in the pixmap in the horizontal direction. Therefore, it is necessary to use 540 individual headers in the second header set 200 to point to 540 pixel lines in the pixmap 190. However, to select the width for the pixmap in the 2H mode, each of the 480 headers in the first header set 198 selects all pixels (e.g., 2096 out of 2096 pixels) in the pixmap in the horizontal direction. Therefore, as an alternative implementation, as shown in FIG. 6, a single header could be used in the first header set 198 to point to 480 center pixel lines in the pixmap.

Figure 7:
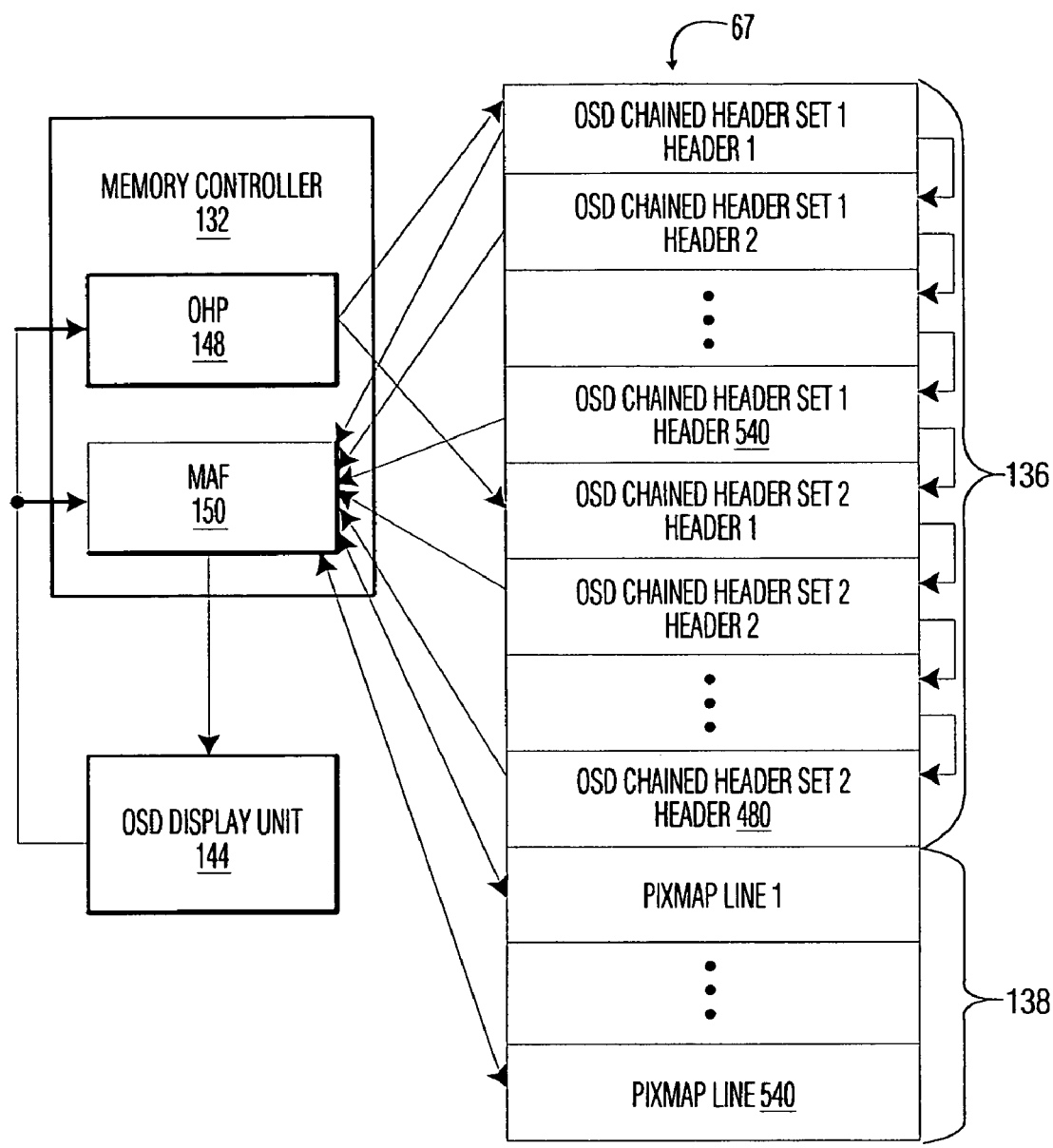
FIG. 7 illustrates an improved OSD arrangement of the present invention.

Referring now to FIG. 7, an improved OSD management and control arrangement of the present invention is illustrated. In accordance with the arrangement of the present invention, an OSD data structure is stored in memory 67 upon initialization of the video receiver. More specifically, the OSD data structure of the present invention includes a single OSD pixmap that is stored in pixel map block 138 of memory 67. The pixmap contains 540 pixel lines with each of the pixel lines containing 2096 pixels. The OSD data structure also includes first and second header sets that are stored in header block 136 of memory 67. The first header set contains 480 individual headers (or may contain only one header, as discussed above.), and the second header set contains 540 individual headers. The individual headers in the first and second header sets are chained together in header block 136 of memory 67. Each individual header contains the memory location of an associated pixel line that is stored in pixel map block 138 of memory 167.

Figure 8:
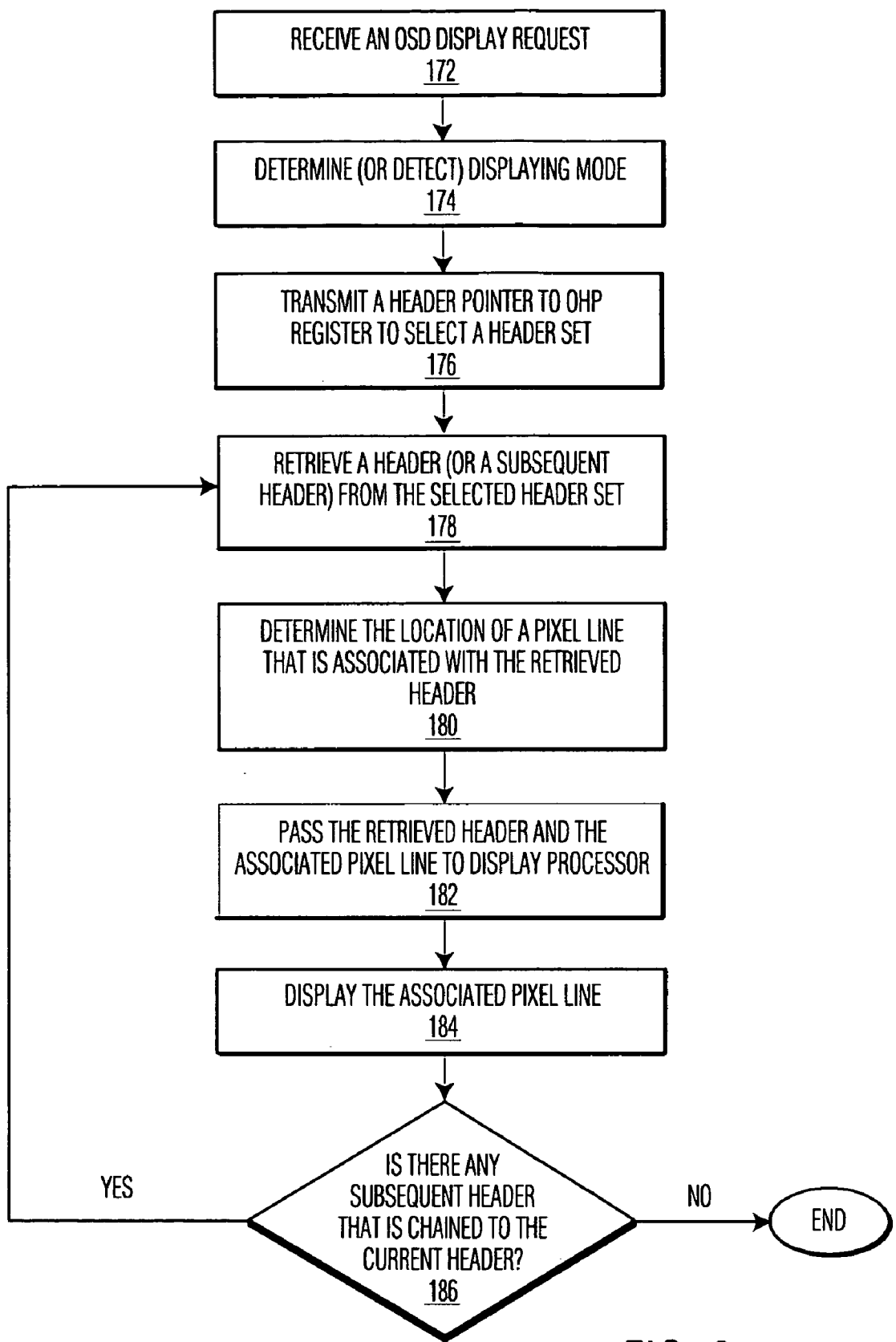
FIG. 8 is a flowchart illustrating a pixmap retrieval process of the present invention.

Referring now to FIG. 8, in conjunction with FIG. 7, an exemplary pixmap retrieval process 170 of the present invention is shown.

At step 172, OSD display unit 144 receives an OSD display request from controller 115. The display request contains the information regarding a displaying mode in which a channel is being watched.

At step 174, based on the received OSD display request, OSD display unit 144 determines (or detects) the displaying mode in the display request.

At step 176, in response to the display request, OSD display unit 144 transmits a header pointer into OHP register 148 based on the detected displaying mode. Specifically, if the detected displaying mode is 2H mode, the transmitted header pointer will select the first header set 198. If the detected displaying mode is 2.14H mode, the transmitted header pointer will select the second header set 200.

At step 178, OHP register 148 services the request by retrieving the first header (or a subsequent header) in the selected header set and writing the retrieved header into MAF register 150.

At step 180, OSD display unit 144 analyzes the retrieved header to determine the location of an associated pixel line that is stored in pixel map block 138.

At step 182, OSD display unit 144 passes the retrieved header and the associated pixel line to display processor 70. At this step, the retrieved header in the selected header set selects the number of pixels (1920 or 2096 pixels) to be displayed, depending on the displaying mode under which the channel is being watched.

At step 184, display processor 70 displays the pixels in center region 192 as color pixels, and the pixels in the selected portion of the sidepanels as gray or transparent pixels.

At step 186, OSD display unit 144 determines whether a subsequent header that is chained to the current header exists in the selected header set. If a subsequent header exists in the selected header set, the operation is returns to step 178 to display a subsequent pixel line in the pixmap. The process from steps 178 through 186 is repeated until the last header in the selected header set is processed.

It should be noted that in the situation where first header set 198 contains only one header, the header will point to center 480 pixel lines in the pixmap. Therefore, OSD display unit 144 retrieves the center 480 pixel lines at one time and passes them together to display processor 70, which further displays the center 480 pixel lines over a video image.

In summary, the present invention can display a single pixmap over multiple video raster sizes. In addition to saving memory space, the present invention also improves displaying speed for a TV system. Thus in a sense, "one size fits all" is an apt description of the pixmap in the present invention. It should be noted that although the present invention has been described with respect to using one pixmap in N (N=2) displaying modes, N could be greater than 2 (N>2). For example, for an arbitrary N, there will be N header sets. The present invention can detect which of the N displaying modes is now being displayed, and one of the N header sets can select a suitable portion of the pixmap accordingly. Thus, so long as a single pixmap is large enough to encompass the largest raster size of the N displaying modes, the present invention can accommodate any of the N displaying modes with a single pixmap.

While the present invention has been described with reference to the preferred embodiments, it is apparent that that various changes may be made in the embodiments without departing from the spirit and the scope of the invention, as defined by the appended claims.

What is claimed is:

1. A method for displaying a pixmap across at least two raster sizes including a first raster size in a first displaying mode and a second raster size in a second displaying mode, comprising the steps of:

storing a single pixmap containing a plurality of pixel lines, said single pixmap having a fixed size that is large enough to encompass the first and second raster sizes;

storing a first header set pointing to a first pixmap region of the stored single pixmap, the first pixmap region fitting the first raster size;

storing a second header set pointing to a second pixmap region of the stored single pixmap, the second pixmap region fitting the second raster size;

detecting whether a displaying mode is in the first displaying mode or the second displaying mode;

using the first header set to only display the first pixmap region of the stored single pixmap and not the second pixmap region of the stored single pixmap when the detected displaying mode is the first displaying mode; and using the second header set to only display the second pixmap region of the stored single pixmap and not first pixmap region of the stored single pixmap when the detected displaying mode is the second displaying mode.

2. The method of claim 1, wherein the first and second header sets contain a plurality of headers, the method further comprising the steps of:

chaining the headers in the first header set; and
chaining the headers in the second header set.

3. The method of claim 2, further comprising the steps of:
using each of the headers in the first header set to point to one of the pixel lines in the pixmap in the first displaying mode; and
using each of the individual headers in the second header set to point to one of the pixel lines in the pixmap in the second displaying mode.

4. The method of claim 3, further comprising the steps of:
using each of the headers in the first header set to select a number of pixels in each of the pixel lines in the first displaying mode; and
using each of the headers in the second header set to select a number of pixels in each of the pixel lines in the second displaying mode.

5. The method of claim 4, wherein the first displaying mode and the second displaying mode display a different number of pixel lines and a different number of pixels in each of the displayed pixel lines.

6. The method of claim 5, wherein the first displaying mode displays 480 pixel lines with each of the pixel lines containing 2096 pixels, and the second displaying mode displays 540 pixel lines with each of the pixel lines containing 1920 pixels.

7. The method of claim 5, wherein the first displaying mode is 2H mode and the second displaying mode is 2.14H mode.

8. A method for displaying a pixmap across at least two raster sizes including a first raster size in a first displaying mode and a second raster size in a second displaying mode, comprising the steps of:
storing a single pixmap containing a plurality of pixel lines, said single pixmap having a fixed size that is large enough to encompass the first and second raster sizes;
storing a first header set containing one header pointing to a first pixmap region of the stored single pixmap, the first pixmap region fitting the first raster size;
storing a second header set containing a plurality of headers pointing to a second pixmap region of the stored single pixmap, the second pixmap region fitting the second raster size;
detecting whether a displaying mode is in the first displaying mode or the second displaying mode;
using the first header set to only display the first pixmap region of the stored single pixmap and not the second pixmap region of the stored single pixmap when the detected displaying mode is the first displaying mode; and
using the second header set to only display the second pixmap region of the stored single pixmap and not the first pixmap region of the stored single pixmap when the detected displaying mode is the second displaying mode.

9. An apparatus for displaying a pixmap across at least two raster sizes including a first raster size in a first displaying mode and a second raster size in a second displaying mode, comprising:
means for storing a single pixmap containing a plurality of pixel lines, said single pixmap having a fixed size that is large enough to encompass the first and second raster sizes;
means for storing a first header set pointing to a first pixmap region of the stored single pixmap, the first pixmap region fitting the first raster size;
means for storing a second header set pointing to a second pixmap region of the stored single pixmap, the second pixmap region fitting the second raster size;
means for detecting whether a displaying mode is in the first displaying mode or the second displaying mode;
means for using the first header set to only display the first pixmap region of the stored single pixmap and not the second pixmap region of the stored single pixmap when the detected displaying mode is the first displaying mode; and
means for using the second header set to only display the second pixmap region of the stored single pixmap and not the first pixmap region of the stored single pixmap when the detected displaying mode is the second displaying mode.

10. The apparatus of claim 9, wherein the first and second header sets contain a plurality of headers, the apparatus further comprising:
means for chaining the headers in the first header set; and
means for chaining the headers in the second header set.

11. The apparatus of claim 9 wherein the first and second header sets contain a plurality of headers, the apparatus further comprising:
means for using each of the headers in the first header set to point to one of the pixel lines in the pixmap in the first displaying mode; and
means for using each of the individual headers in the second header set to point to one of the pixel lines in the pixmap in the second displaying mode.

12. The apparatus of claim 11, further comprising:
means for using each of the headers in the first header set to select a number of pixels in each of the pixel lines in the first displaying mode; and
means for using each of the headers in the second header set to select a number of pixels in each of the pixel lines in the second displaying mode.

13. The apparatus of claim 9, wherein the first displaying mode and the second displaying mode display a different number of pixel lines and a different number of pixels in each of the displayed pixel lines.

14. The apparatus of claim 13, wherein the first displaying mode displays 480 pixel lines with each of the pixel lines containing 2096 pixels, and the second displaying mode displays 540 pixel lines with each of the pixel lines containing 1920 pixels.

15. The apparatus of claim 13, wherein the first displaying mode is 2H mode and the second displaying mode is 2.14H mode.

16. An apparatus for displaying a pixmap across at least two raster sizes including a first raster size in a first displaying mode and a second raster size in a second displaying mode, comprising:
means for storing a single pixmap containing a plurality of pixel lines, said single pixmap having a fixed size that is large enough to encompass the first and second raster sizes;
means for storing a first header set containing one header pointing to a first pixmap region of the stored single pixmap, the first pixmap region fitting the first raster size;
means for storing a second header set containing a plurality of headers pointing to a second pixmap region of the stored single pixmap, the second pixmap region fitting the second raster size;

means for detecting whether a displaying mode is in the first displaying mode or the second displaying mode;
means for using the first header set to only display the first pixmap region of the stored single pixmap and not the second pixmap region of the stored single pixmap when the detected displaying mode is the first displaying mode; and means for using the second header set to only display the second pixmap region of the stored single pixmap and not the first pixmap region of the stored single pixmap when the detected displaying mode is the second displaying mode.

* * * * *